UNITED STATES PATENT OFFICE.

JOHN H. CANNON AND JAMES M. FREAM, OF ALEXANDRIA, LOUISIANA.

COMPOSITION.

1,316,422.  Specification of Letters Patent.  Patented Sept. 16, 1919.

No Drawing.  Application filed July 7, 1919.  Serial No. 309,093.

*To all whom it may concern:*

Be it known that we, JOHN H. CANNON and JAMES M. FREAM, citizens of the United States, residing at Alexandria, in the parish of Rapides and State of Louisiana, have invented a new and useful Composition, of which the following is a specification.

This invention relates to a composition of matter for use as a soldering flux, one of its objects being to provide a non-poisonous, and non-corrosive fluid which does not possess the objectionable qualities of the usual acids employed, and will allow the solder to run evenly over the surfaces being treated and will act as a preservative of the metal rather than a destructive agency.

Another object is to provide a flux which can be carried in the pocket or other container without danger of injury, does not give off poisonous fumes, and will not injure or destroy brushes, tools or the like used in connection therewith.

Another object is to provide a flux which is cheap to manufacture and is efficient in use.

With the foregoing and other objects in view the invention consists of the following ingredients substantially in the proportions stated, to wit:

| | |
|---|---|
| Alcohol | 50% |
| Sulfate of zinc | 25% |
| Glycerin | 25% |

The alcohol used can be either wood alcohol or grain alcohol. Any of the salts of zinc can be used in lieu of the sulfate of zinc. The proportions above indicated can also be changed although the proportions given are preferred.

The glycerin is used to facilitate the dissolving of the zinc sulfate in the alcohol which, otherwise, would not dissolve the desired amount. The zinc sulfate and the glycerin are first mixed and the alcohol then added. The resultant fluid is clear and odorless and has no fumes. It might be added that the mixture should stand for at least twenty-four hours before using, thus to give the zinc sulfate sufficient time to dissolve.

What is claimed is:—

1. A composition of matter for use as a soldering flux including alcohol, glycerin and a zinc salt.

2. A composition of matter for use as a soldering flux including alcohol, glycerin, and sulfate of zinc.

3. A composition of matter for use as a soldering flux including glycerin, approximately 25%, alcohol approximately 50% and a zinc compound 25%.

In testimony that we claim the foregoing as our own, we have hereto affixed our signatures in the presence of two witnesses.

JOHN H. CANNON, M. D.
JAMES M. FREAM.

Witnesses:
J. C. KNEBE,
MAYME MURPHY,